United States Patent
Gharib et al.

(10) Patent No.: US 11,801,566 B2
(45) Date of Patent: Oct. 31, 2023

(54) DYNAMIC DUTY CYCLE FOR A WELDING AND CUTTING APPARATUS

(71) Applicant: The ESAB Group Inc., Florence, SC (US)

(72) Inventors: Awad Gharib, Columbia, MD (US); Lee Mantell, Essex, MD (US)

(73) Assignee: THE ESAB GROUP, INC., North Bethesda, MD (US)

( * ) Notice: Subject to any disclaimer, the term of this patent is extended or adjusted under 35 U.S.C. 154(b) by 504 days.

(21) Appl. No.: 17/113,259

(22) Filed: Dec. 7, 2020

(65) Prior Publication Data

US 2021/0086283 A1 Mar. 25, 2021

Related U.S. Application Data

(63) Continuation of application No. 15/858,019, filed on Dec. 29, 2017, now Pat. No. 10,882,131.

(60) Provisional application No. 62/440,477, filed on Dec. 30, 2016.

(51) Int. Cl.
  *B23K 9/10* (2006.01)
  *H02M 3/157* (2006.01)
  *B23K 9/095* (2006.01)

(52) U.S. Cl.
  CPC .......... *B23K 9/1062* (2013.01); *B23K 9/0953* (2013.01); *B23K 9/1006* (2013.01); *H02M 3/157* (2013.01)

(58) Field of Classification Search
  CPC .. B23K 9/1062; B23K 9/0953; B23K 9/1006; H02M 3/157
  See application file for complete search history.

(56) References Cited

U.S. PATENT DOCUMENTS

| | | |
|---|---|---|
| 6,051,805 A | 4/2000 | Vaidya et al. |
| 7,297,899 B2 | 11/2007 | Fosbinder |
| 7,705,269 B2 | 4/2010 | Daniel |
| 7,714,252 B2 | 5/2010 | Casner |
| 8,184,422 B2 | 5/2012 | Rotem |
| 8,455,794 B2 | 6/2013 | Vogel |
| 10,307,855 B2 | 6/2019 | Nikou |

(Continued)

FOREIGN PATENT DOCUMENTS

| | | |
|---|---|---|
| CN | 104209959 A | 12/2014 |
| WO | 2010141431 A1 | 12/2010 |
| WO | 2012143899 A1 | 10/2012 |

OTHER PUBLICATIONS

First Office Action from Mexican Institute of Industrial Property (IMPI) with English machine translation for Mexican Patent Application No. MX/a/2019/007497 dated Apr. 22, 2022, 6 pages.

(Continued)

*Primary Examiner* — Donnell A Long
(74) *Attorney, Agent, or Firm* — Edell, Shapiro & Finnan, LLC (57) ABSTRACT

A welding apparatus is configured to obtain values of one or more real-time operating parameters associated with the welding apparatus. Using the values of the one or more operating conditions, the welding apparatus is configured to determine a dynamic duty cycle of the welding apparatus, given the present/current operating conditions of the welding apparatus.

20 Claims, 7 Drawing Sheets

(56) References Cited

U.S. PATENT DOCUMENTS

| | | | |
|---|---|---|---|
| 2005/0263515 A1* | 12/2005 | Fosbinder | B23K 9/1006 |
| | | | 219/133 |
| 2006/0118534 A1 | 6/2006 | Casner et al. | |
| 2008/0264920 A1 | 10/2008 | Leisner et al. | |
| 2009/0008374 A1 | 1/2009 | Fosbinder | |
| 2010/0308026 A1 | 12/2010 | Vogel | |
| 2010/0308027 A1* | 12/2010 | Vogel | B23K 9/0953 |
| | | | 219/130.21 |
| 2012/0085741 A1 | 4/2012 | Holverson | |
| 2013/0334179 A1 | 12/2013 | Scholz | |
| 2014/0034614 A1 | 2/2014 | Sbetti | |
| 2014/0061169 A1 | 3/2014 | Sammons | |
| 2014/0358279 A1 | 12/2014 | Kimoto | |
| 2016/0067809 A1 | 3/2016 | Enyedy et al. | |
| 2016/0125763 A1 | 5/2016 | Becker | |
| 2018/0185949 A1 | 7/2018 | Gharib et al. | |
| 2020/0009674 A1 | 1/2020 | Zucker | |

OTHER PUBLICATIONS

First Office Action from China National Intellectual Property Administration with English translation for Chinese Application for Invention No. 201780081307.0 dated Nov. 3, 2020, 16 pages.

International Search Report and Written Opinion of PCT/EP2017/068933 dated May 2, 2018.

Examination Report No. 1 for Australian Patent Application No. 2017391412 dated Apr. 23, 2020, 3 pages.

Office Action for Canadian Patent Application No. 3,046,239 dated Jul. 2, 2020, 4 pages.

Communication Pursuant to Article 94(3) for European Patent Application No. 17832718.5 dated Sep. 15, 2020, 6 pages.

* cited by examiner

650 monitoring, via one or more transducers, one or more operating parameters associated with the welding apparatus — 652 determining, based on the one or more operating parameters, a dynamic duty cycle of the welding apparatus — 654 providing, via a user interface of the welding apparatus, one or more indications of a real-time value of the dynamic duty cycle. — 656

FIG. 7

760 obtaining a real-time value of at least one operating parameter associated with a welding apparatus — 762 determining, based on the real-time value of at least one operating parameter, an estimate of the remaining operational time of the welding apparatus — 764 controlling one or more operations of the welding apparatus based on the estimate of the remaining operational time of the welding apparatus — 766

DYNAMIC DUTY CYCLE FOR A WELDING AND CUTTING APPARATUS

CROSS-REFERENCE TO RELATED APPLICATIONS

This application is a continuation of U.S. application Ser. No. 15/858,019, filed Dec. 29, 2017, which claims priority to U.S. Provisional Patent Application No. 62/440,477, filed Dec. 30, 2016, the entire contents of both of which is incorporated herein by reference.

BACKGROUND

Field of the Invention

The present invention relates generally to determining a dynamic duty cycle for a welding apparatus.

Related Art

Welding, cutting, or heating are common operations/processes performed in fabrication, manufacturing, construction, or other applications. For example, welding is a fabrication or sculptural process that uses electrical energy to join materials (e.g., metals, thermoplastics, etc.). Cutting is a process that uses electrical energy to cut through a piece of material, while heating is a process that uses electrical energy to increase the temperature of a material (e.g., to cut the material, to bend the material, etc.). As used herein, a "welding or cutting apparatus," or simply "welding apparatus" refers to an apparatus that uses electrical energy to perform welding, cutting, or heating operations.

Welding apparatuses are generally powered from alternating current (AC) sources at a voltage of, for example, ninety (90) Volts (V) or greater. In different settings, the AC voltage delivered by the AC mains to the welding apparatus may be different. Certain conventional welding apparatuses may convert the AC voltage to a fixed output voltage that is independent of the input. This fixed output voltage may be a relatively high voltage (e.g., 500V, 700V, etc.) or another target voltage, where the fixed output voltage is output through a transformer to reduce the voltage. In addition to generating the energy used to perform the target operation (e.g., welding, cutting, heating), the power received from the AC source may also be harnessed to power various components included in the welding apparatus.

Welding apparatuses also generally have a rating plate (e.g., in or attached to the apparatus, included within an operating manual, etc.) that specifies, or that can be used to determine, a "duty cycle rating" for operation of the welding apparatus. In conventional arrangements, a welding apparatus is associated with a static (predetermined) duty cycle rating that indicates a length of time that the welding apparatus can operate at its maximum output current without damaging the apparatus (e.g., the relative percentage of time a welding apparatus can perform actual welding operations, as opposed to the time the apparatus is idle, off, etc.). In certain cases, the duty cycle rating is based on a ten-minute time period such that a welding machine with a 60% duty cycle can be used at its maximum rated output current for six out of every ten minutes.

SUMMARY

In one aspect, a method performed at a welding apparatus is provided. The method comprises: monitoring, via one or more transducers, one or more operating parameters associated with the welding apparatus; determining, based on the one or more operating parameters, a dynamic duty cycle of the welding apparatus; and providing, via a user interface of the welding apparatus, one or more indications of a real-time value of the dynamic duty cycle.

In another aspect, a welding apparatus is provided. The welding apparatus comprises: a power supply configured to generate an output current for at least one of a welding, cutting, or heating operation; one or more transducers configured to monitor one or more operating parameters associated with the welding apparatus; and a controller configured to: determine, based on the one or more operating parameters associated with the welding apparatus, a dynamic duty cycle of the welding apparatus; and control one or more operations of the welding apparatus based on a real-time value of the dynamic duty cycle.

In another aspect, a method performed at a welding apparatus is provided. The method comprises: obtaining a real-time value of at least one operating parameter associated with a welding apparatus; determining, based on the real-time value of at least one operating parameter, an estimate of the remaining operational time of the welding apparatus; and controlling one or more operations of the welding apparatus based on the estimate of the remaining operational time of the welding apparatus.

DETAILED DESCRIPTION

As noted above, in conventional arrangements, the duty cycle rating of a welding or cutting apparatus (welding apparatus) is a static (predetermined) device rating indicating a length of time that a welding apparatus can operate at its maximum output current, within a given time period, without damaging the apparatus (e.g., the relative percentage of time a welding apparatus can perform actual welding, cutting, or heating operations, as opposed to the time the apparatus is idle, off, etc.). These static duty cycle ratings are intended to be employed by a user of a welding apparatus as a guide to ensure that the welding apparatus does not operate for an excessive amount of time.

However, conventional static duty cycle ratings may be insufficient for many welding apparatuses and users thereof. In particular, users may have a difficult time understanding the duty cycle rating and/or applying the duty cycle rating during operation of the welding apparatus. For example, it may be difficult for a user to track the actual welding time of the welding apparatus (i.e., the time that the apparatus generates output current) relative to the non-welding time (i.e., the idle or off time of the welding apparatus) which can lead to overutilization or underutilization of the welding apparatus. Additionally, welding apparatus users may be trained to take precautionary measures to ensure that the static duty cycle rating is not violated, which often leads to inefficient use of the welding apparatus (i.e., err on the side of caution to underutilize the welding apparatus).

Conventional static duty cycle ratings are also generally set using specified predetermined values for operating parameters (operating conditions) associated with the welding apparatus. These specified values for the operating parameters generally include a specific ambient temperature (e.g., forty (40) degrees Celsius (C)) and that the welding apparatus, while operating, generates the maximum possible output current while performing the welding operation (i.e., the welding apparatus runs at maximum output throughout the entire operational period). However, in practice, a welding apparatus may not be used under these exact same specific operating conditions and, as such, the static duty cycle rating may be inaccurate. The result is often underutilization of the welding apparatus and/or error conditions in which the welding apparatus could overheat, automatically shut down, etc.

Presented herein are techniques to address the above and other inadequacies associated with the reliance on static duty cycle ratings of a welding apparatus. More specifically, in accordance with embodiments presented herein, a welding apparatus is configured to obtain (e.g., monitor via one or more transducers, receive via a user interface, etc.) values of one or more real-time (i.e., current/present) operating parameters associated with the welding apparatus. Using the values of the one or more operating conditions, the welding apparatus is configured to determine a "dynamic duty cycle" of the welding apparatus. As described further below, the "dynamic duty cycle" is a measure or estimate of the remaining operational time or run-time of the welding apparatus, given the present/current operating conditions of the welding apparatus. The remaining operational time (run-time) of the welding apparatus refers to the time that the welding apparatus may be used to actually perform a welding, heating, or cutting operation before damage to the welding apparatus will occur as a result of the welding, heating, or cutting operation.

In accordance with embodiments presented herein, the dynamic duty cycle for the welding apparatus can be used to control one or more operations of the welding apparatus. For example, a real-time value of the dynamic duty cycle may be used to control an output (e.g., output current, output voltage, etc.) of the welding apparatus. The real-time value of the dynamic duty cycle may be used to control a user interface of the welding apparatus (e.g., control the user interface to provide one or more indications of the real-time value of the dynamic duty cycle). Accordingly, the techniques presented herein provide improvements over conventional welding apparatuses by, in certain embodiments, providing users with an accurate indication of how long the welding apparatus may be used without damage and/or a forced shutdown (i.e., without reaching overutilization). As a result, the welding apparatus can be used more effectively than conventional apparatuses.

Figure 1:
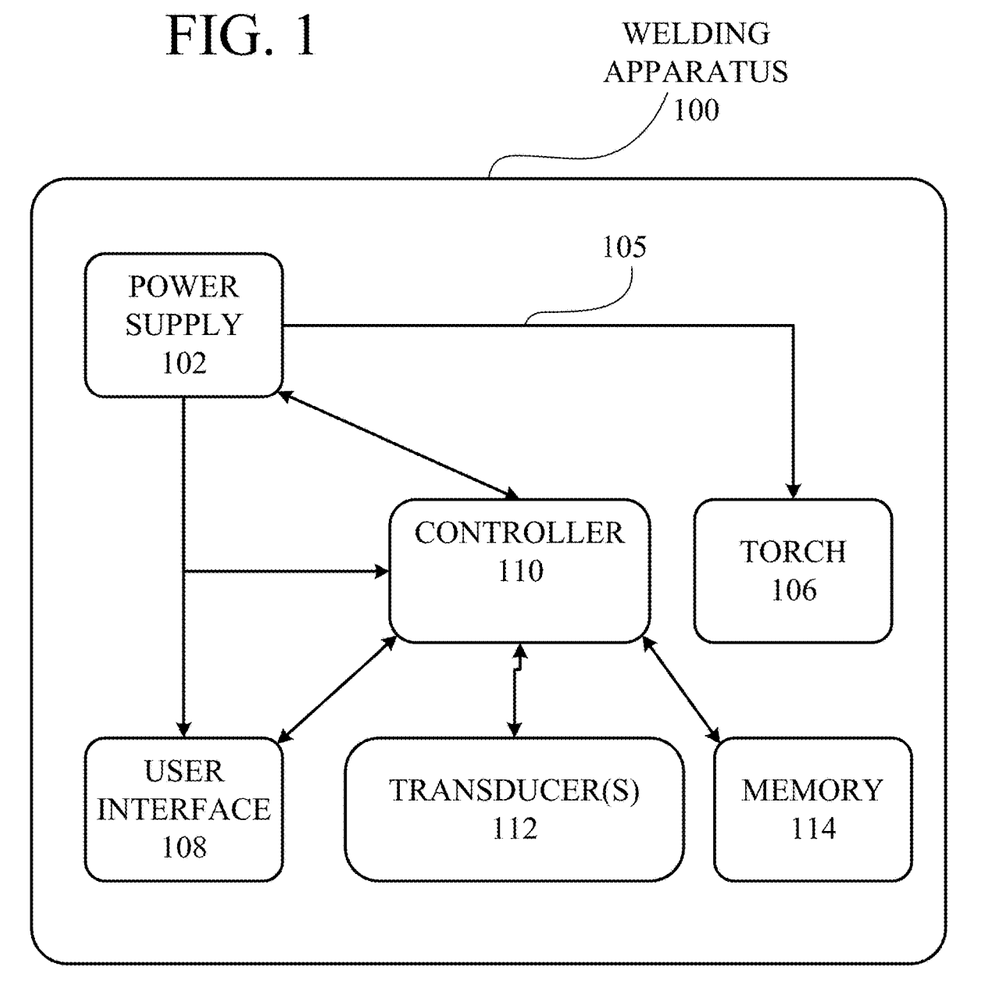
FIG. 1 is block diagram of an exemplary apparatus, in accordance with certain embodiments presented herein.

FIG. 1 depicts a block diagram of an exemplary welding or cutting apparatus (welding apparatus) 100 according to certain embodiments presented herein. As shown, the example welding apparatus 100 comprises a power supply 102, a torch 106, a user interface 108, a controller 110, a transducer 112, and a memory 114. It is to be appreciated that welding apparatuses in accordance with embodiments presented herein may include other components which, for ease of illustration, have been omitted from FIG. 1.

The example components of the welding apparatus 100 shown in FIG. 1 may interoperate to control an output current 105 that is provided to torch 106 for performing a welding, cutting, or heating operation. While the output current 105 is being provided to the torch 106, the welding apparatus is referred to as being "operational" or "running," meaning the welding apparatus 100 is being used to perform a functional operation (e.g., a welding, cutting, or heating operation). In contrast, when the output current 105 is not being provided to the torch 106, the welding apparatus 100 is referred to as being "idle" or "on standby."

In operation, the power supply 102 is configured to transform power received by the welding apparatus 100, such as from an alternating current (AC), into the output current 105 for use by the torch 106. The power supply 102 is also configured to transform the power received by the welding apparatus 100 into auxiliary power that is used to one or more components of the apparatus 100, such as torch 106, user interface 108, controller 110, or other components, as needed. The power supply 102 may include a number of components such as one or more input rectifiers, converters, inverters, transformers, output circuitry, or other components.

The duration of the output current 105 is controlled by a user of the welding apparatus 100 (and/or by some automated processing), but generally complies with a "dynamic duty cycle" that is determined by controller 110. As noted above, the "dynamic duty cycle" is a measure of the remaining operational time of the welding apparatus before damage to the welding apparatus will occur as a result of the operation thereof. In accordance with embodiments presented herein, the dynamic duty cycle is determined by the controller 110 based on real-time values of one or more operating parameters associated with the welding apparatus 100. As such, the determined dynamic duty cycle is context specific, meaning it is specifically determined on, and tailored to, the current operating conditions of the welding apparatus 100.

As noted, the controller 110 is configured to determine the dynamic duty cycle based on the real-time values of one or more operating parameters associated with the welding apparatus 100. In certain embodiments, the real-time values of the one or more operating parameters may be obtained via one or more transducers 112. The operating parameters obtained by the one or more transducers 112 may be parameters associated with a functional operation (e.g., welding, cutting, or heating operation) performed by the welding apparatus 100. Examples of operating parameters associated with a functional operation of the welding apparatus 100 may include, for example, one or more of a voltage, component temperature, polarity, current, effective current, material thickness, wire feed speed, shielding gas type, material type, functional operation type, etc. In the same or other embodiments, the operating parameters obtained by the one or more transducers 112 are parameters associated with the ambient environment of the welding apparatus. For example, the one or more transducers 112 may be configured to measure the ambient temperature of the welding apparatus 100. Therefore, in accordance with embodiments presented herein, the one or more transducers 112 may include one or more sensors such as temperature, humidity, voltage, current, effective current, and wire feed speed sensors for identifying real-time values for operating parameters associated with the welding apparatus 100.

In certain embodiments, the welding apparatus 100 does not include any transducers and/or makes use of real-time operating parameters obtained using other techniques. In one such embodiment, the ambient temperature may be approximated by the controller 110 based on a record of activity of welding apparatus 100. For example, when welding apparatus 100 has not actively engaged in a welding, cutting, or heating operation within a relatively long period of time (e.g., 1+ hours), the controller 110 may determine that the ambient temperature is low (e.g., 40° C.). However, when apparatus 100 has been actively engaged in an operation within a relatively short period of time (e.g., less than 1 hour), the controller 110 may determine that the ambient temperature is high (e.g., 80° C.). In some embodiments, the record of activity of welding apparatus 100 may be stored in memory 114. As described further below, the determination or approximation of the ambient temperature, in real-time, may thus allow the controller 110 to intermittently, occasionally, or continuously alert a user as to the dynamic duty cycle employed by the welding apparatus 100, or may allow the operation of the welding apparatus 100 to be dynamically adjusted so as to prevent excessive heating while also allowing maximum use when the welding apparatus 100 is relatively cooler.

In various embodiments, one or more operating parameters may be obtained via user interface 108, determined via the one or more transducers 112, and/or retrieved from memory 114. For example, controller 110 may cause user interface 108 to request (e.g., prompt a user to provide) and receive material thickness and wire feed speed parameters while the one or more transducers 112 may be used to determine the ambient temperature of welding apparatus 100. In another example, the ambient temperature may be retrieved from memory 114. In a further example, the dynamic duty cycle may be initially determined based on an ambient temperature stored in memory 114 and then dynamically adjusted based on ambient temperature measurements from the one or more transducers 112.

The dynamic duty cycle determined by the controller 110 may be used by the welding apparatus 100 in a number of different manners. For example, in certain embodiments, the dynamic duty cycle may be used by the power supply 102 (or other component) as a control input that terminates the flow of the output current 105 to the torch 106 in order to prevent damage to the welding apparatus 100 (e.g., the controller 110 may implement the dynamic duty cycle by sending control directives to power supply 102). That is, the apparatus 100 may automatically control operations based upon the determined dynamic duty cycle. As noted above, the use of a dynamic duty cycle to control the flow of the output current 105 to the torch 106, rather than a generic static duty cycle, enables more efficient use of the welding apparatus 100 that is specifically tailored to the operating conditions of the welding apparatus 100.

In the same or other embodiments, the dynamic duty cycle may also be used to generate one or more indications/notifications to a user of the welding apparatus 100. For example, one or more indications of the dynamic duty cycle may be provided to a user via (within) the user interface 108 and the user may manually control operation of the welding apparatus 100 based upon the indicated (e.g., displayed) dynamic duty cycle.

In various embodiments, the controller 110 may provide an indication of the determined dynamic duty cycle via user interface 108. In accordance with embodiments presented herein, the user interface 108 may have a number of different arrangements. For example, the user interface 108 may include one or more output devices, such as a cathode ray tube (CRT) display, a liquid crystal display (LCD) or other type of digital display, a speaker, etc. for presentation of visual or audible indications/notifications to a user. In other examples, the one or more output devices may be one or more components configured to facilitate inter-operation with a so-called "heads-up display" incorporated, for example, into a helmet, glasses, etc. In yet another example, the one or more output devices may include, one or more light emitting diodes (LEDs).

The user interface 108 may also comprise one or more input devices that include, for example, a keypad, keyboard, touchscreen, etc. that can accept a user input. In certain examples, the one or more output devices and the one or more input devices may integrated with one another using touch screen technology.

As noted, the user interface 108 (e.g., the one or more output devices) may be configured to provide (e.g., display) an indication of the dynamic duty cycle, i.e., a maximum duration of operation at which the welding apparatus 100 can perform a functional operation, such as welding, before the welding operation is terminated. The welding operation may be terminated via automatic shut down of the welding apparatus 100, termination of the output current 105, powering down of the power supply 102, etc.

In some embodiments, the indication of the dynamic duty cycle may be a percentage of a period of time for operating the welding apparatus 100 at a sufficient energy to actively perform an associated functional (e.g., welding, cutting, or heating) operation. For example, a 75% dynamic duty cycle may allow an operator to actively weld, cut, or heat a workpiece for three minutes out of every four minutes.

It is to be appreciated that the techniques presented herein may implemented in firmware, partially or fully implemented with digital logic gates in one or more application-specific integrated circuits (ASICs), partially or fully implemented in software, etc. For example, in certain embodiments, the controller 110 may include one or more one or more microprocessors or microcontrollers, one or more systems on a chip, or similar devices with processor circuitry.

In various embodiments, memory 114 may store instructions that enable the controller 110 to implement one or more functions described herein. In these embodiments, memory 114 may comprise read only memory (ROM), random access memory (RAM), magnetic disk storage media devices, optical storage media devices, flash memory devices, electrical, optical, or other physical/tangible memory storage devices. The controller 110 may execute instructions for logic stored in the memory 114. Thus, in general, the memory 114 may comprise one or more tangible (non-transitory) computer readable storage media (e.g., a memory device) encoded with software comprising computer executable instructions and when the software is executed (by the controller 110) it is operable to perform operations described herein.

FIGS. 2-5 are schematic diagram illustrating indications of dynamic duty cycles that may be provided at/via a user interface, such as user interface 108, in accordance with embodiments presented. In the examples of FIGS. 2-5, the indications are provided via a particular type of output component, namely a display device. It is to be appreciated that these specific indications are illustrative and that, in accordance with embodiments herein, a user may be provided with one or more other indications of a dynamic duty cycle. For ease of illustration, the displays of FIGS. 2-5 will generally be described with reference to welding apparatus 100 of FIG. 1.

Figure 2:
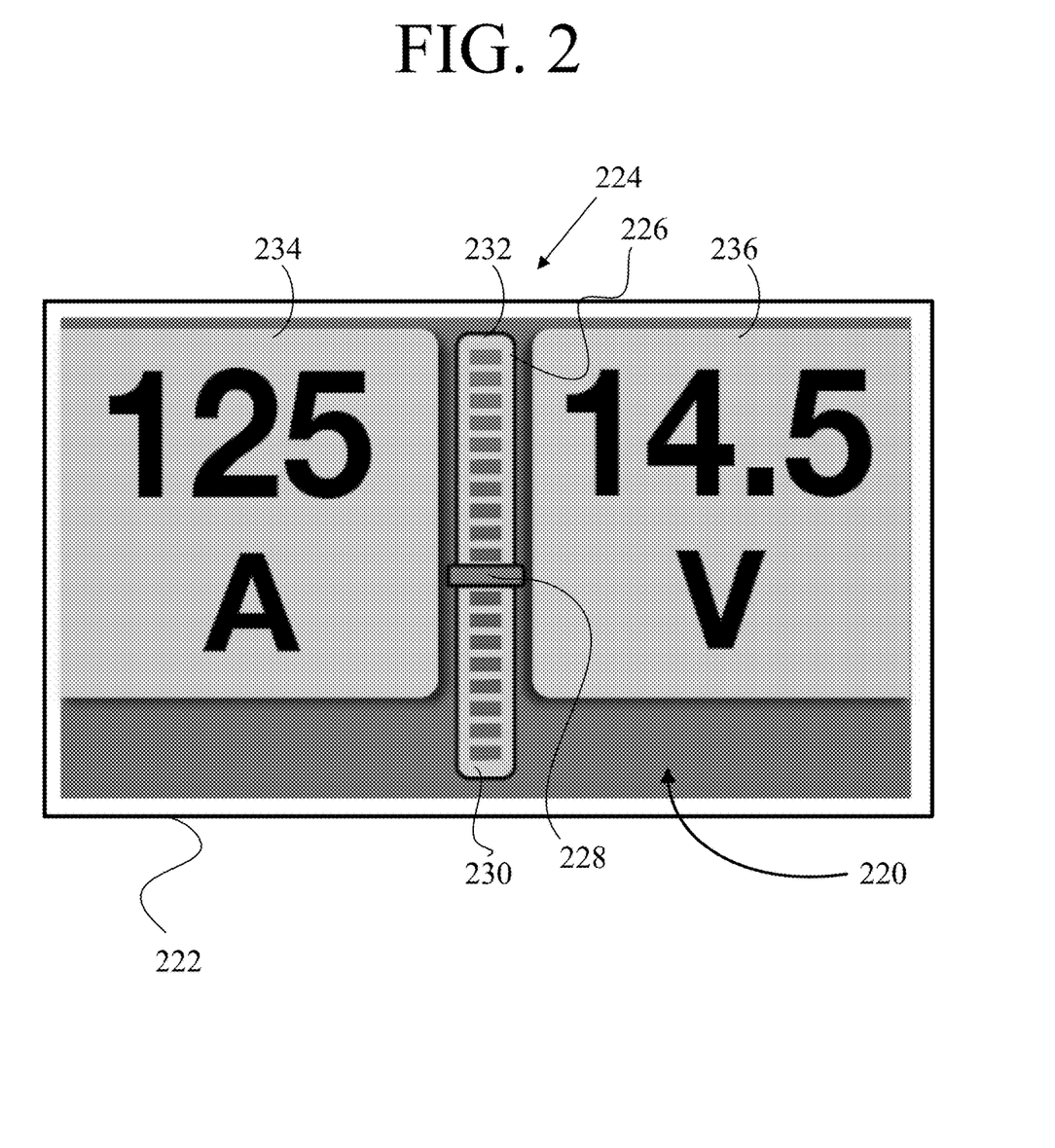
FIG. 2 is schematic diagram of a user interface display, in accordance with certain embodiments presented herein.

Referring first to FIG. 2, shown is an example display 220 provided via a display device 222 in accordance with embodiments presented herein. In the example of FIG. 2, the display 220 includes an indication 224 of the dynamic duty cycle, where the indication 224 comprises a type of thermal gauge display.

More specifically, as shown, the thermal gauge display 224 is formed by a scale 226 and a slider 228. The slider 228 moves across the scale 226 in dependence upon a real-time (instantaneous) value of the determined dynamic duty cycle. For example, when the welding apparatus 100 is first powered on, the dynamic duty cycle will have a maximum value for the present operating conditions. As a result, the slider 228 may be located at a first end 230 of the scale 226. As the welding apparatus 100 is used to perform a functional operation (e.g., welding), the value of the dynamic duty cycle will gradually decrease (i.e., the remaining run time for the welding apparatus 100 is decreasing). As the value of the dynamic duty cycle decreases, the slider 228 moves along the scale 226 towards a second end 232 of the scale. When the dynamic duty cycle reaches a threshold value (e.g., zero), the slider 228 will be located at, or close to, the second end 232. At this point, operation of the welding apparatus 100 may be automatically terminated and/or damage to the welding apparatus 100 is likely to occur.

As noted, the slider 228 moves across the scale 226 in dependence upon a real-time (instantaneous) value of the determined dynamic duty cycle. Therefore, as noted above, the slider 228 moves towards second end 232 as the dynamic duty cycle decreases. However, is to be appreciated that, when the welding apparatus 100 is not being used to perform a functional operation (i.e., the welding apparatus is not being used for welding, cutting, or heating), the dynamic duty cycle will increase. As such, as the dynamic duty cycle increases, the slider 228 moves towards first end 230 as the dynamic duty cycle increases.

In certain embodiments, as the slider 228 moves across the scale, the user (or the welding apparatus 100 itself) could adjust one or more operating parameters of the apparatus to extend the dynamic duty cycle. That is, the welding apparatus 100 could be dynamically reconfigured in real-time, potentially automatically, so as to operate at a lower performance level, but for a longer period of time. This dynamic reconfiguration could, for example, occur at certain threshold values of the dynamic duty cycle.

In summary, the thermal gauge display 224 of FIG. 2 is a schematic representation of the instantaneous or real-time value of the determined dynamic duty cycle, and the gauge display dynamically changes over time. As a result, a user can use the thermal gauge display 224 to determine when the welding apparatus 100 is approaching a potential automatic shutdown, damage, etc.

It is to be appreciated that, although the dynamic duty cycle may be determined based on a temperature or other thermal property of the welding apparatus 100 (or components thereof), the thermal gauge display 224 is not a direct representation of any of these thermal properties. Instead, the thermal gauge display 224 is one manner of conveying information regarding the remaining operational time of the welding apparatus 100 to a user of the welding apparatus.

In the example of FIG. 2, in addition to the thermal gauge display 224, the display 220 also includes information regarding operating parameters associated with the welding apparatus 100. In particular display 220 includes a display item 234 that indicates an amperage of the welding apparatus 100 (e.g., amperage of the output current) and a display item 236 that includes a voltage of the welding apparatus 100. In operation, one or more of these parameters may be adjusted by the user, or may be determined by welding apparatus 100 automatically. Further, display items 234 and 236 may include, or be replaced with, other parameters discussed herein.

Figure 3:
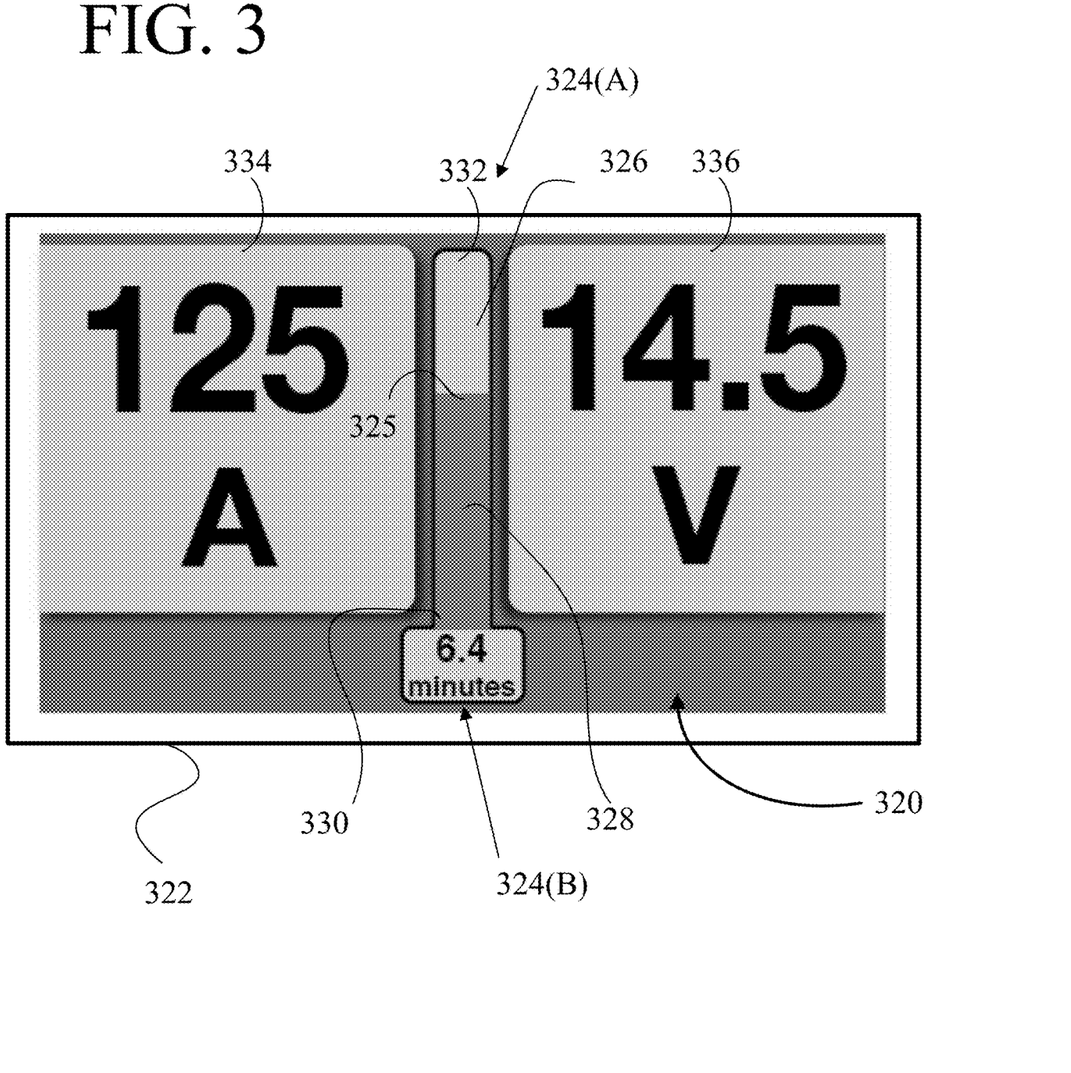
FIG. 3 is schematic diagram of a user interface display, in accordance with certain embodiments presented herein.

Referring next to FIG. 3, shown is an example display 320 provided via a display device 322 in accordance with embodiments presented herein. In the example of FIG. 3, the display 320 includes two indications of the dynamic duty cycle, shown as indications 324(A) and 324(B). The indication 324(A) comprises a type of thermographic or ThermoGraph display, while the indication 324(B) comprises a timer.

More specifically, as shown, the thermographic display 324(A) is formed by a fillable bar 326 and an expansion member 328. The expansion member 328 operates to fill the fillable bar 326 in dependence upon a real-time (instantaneous) value of the determined dynamic duty cycle. For example, when the welding apparatus 100 is first powered on, the dynamic duty cycle will have a maximum value for the present operating conditions. As a result, the expansion member 328 will have an upper portion 325 that is located at a first end 330 of the fillable bar 326. As the welding apparatus 100 is used to perform a functional operation (e.g., welding), the value of the dynamic duty cycle will gradually decrease (i.e., the remaining run time for the welding apparatus 100 is decreasing). As the value of the dynamic duty cycle decreases, the expansion member 328 expands (i.e., the upper portion 325 moves toward a second end 332 of the fillable bar 326). When the dynamic duty cycle reaches a threshold value (e.g., zero), the upper portion 325 of the expansion member 328 will be located at, or close to, the send end 332 such that the expansion member 328 substantially fills the fillable bar 326. At this point, operation of the welding apparatus 100 may be automatically terminated and/or damage to the welding apparatus 100 is likely to occur. Conversely, as the value of the dynamic duty cycle increases (e.g., when the welding apparatus 100 is not being used to perform a functional operation), the expansion member 328 contracts (i.e., the upper portion 325 moves toward first end 332 of the fillable bar 326).

In certain embodiments, as the expansion member 328 fills the fillable bar 326, the user (or the welding apparatus 100 itself) could adjust operating parameters of the apparatus to extend the dynamic duty cycle. That is, the welding apparatus 100 could be dynamically reconfigured in real-time, potentially automatically, so as to operate at a lower performance level, but for a longer period of time. This dynamic reconfiguration could, for example, occur at certain threshold values of the dynamic duty cycle.

It is to be appreciated that, although the dynamic duty cycle may be determined based on a temperature or other thermal property of the welding apparatus 100 (or components thereof), the thermographic display 324(A) is not a direct representation of any of these thermal properties. Instead, the thermographic display 324(A) is one manner of conveying information regarding the remaining operation time of the welding apparatus 100 to a user of the welding apparatus.

As noted, the display 320 also includes a timer 324(B). The timer 324(B) provides a direct, numerical indication of the instantaneous value of the dynamic duty cycle. That is, the timer 324(B) directly indicates a period of time (e.g., 6.4 minutes, as an example) that the welding apparatus 100 may continue to operate, given the present operating parameters, before operation of the welding apparatus 100 is automatically terminated and/or damage to the welding apparatus 100 is likely to occur. Similar to the thermographic display 324(A), the timer 324(B) will dynamically update in dependence on the instantaneous value of the dynamic duty cycle. The timer 324(B) may also adjust if the welding apparatus 100 is dynamically reconfigured in real-time, as detailed above.

When the value of the dynamic duty cycle is decreasing as a result of use of the welding apparatus 100 for a functional operation, the timer 324(B) counts downward to a predetermined value (e.g., zero). However, as the value of the dynamic duty cycle is increasing as a result of non-use of the welding apparatus 100 for a functional operation, the timer 324(B) counts upward to a maximum operational time value.

In summary, the thermographic display 324(A) and the timer 324(B) of FIG. 3 are different schematic representations of the real-time or instantaneous value of the determined dynamic duty cycle, and these indications dynamically change over time. As a result, a user can use the thermographic display 324(A) and/or the timer 324(B) to determine when the welding apparatus 100 is approaching a potential automatic shutdown, damage, etc.

In the example of FIG. 3, in addition to the thermographic display 324(A) and the timer 324(B), the display 320 also includes information regarding operating parameters associated with the welding apparatus 100. In particular display 320 includes a display item 334 that indicates an amperage of the welding apparatus 100 (e.g., amperage of the output current) and a display item 336 that includes a voltage of the welding apparatus 100. In operation, one or more of these parameters may be adjusted by the user, or may be determined by welding apparatus 100 automatically. Further, display items 334 and 336 may include, or be replaced with, other parameters discussed herein.

Figure 4:
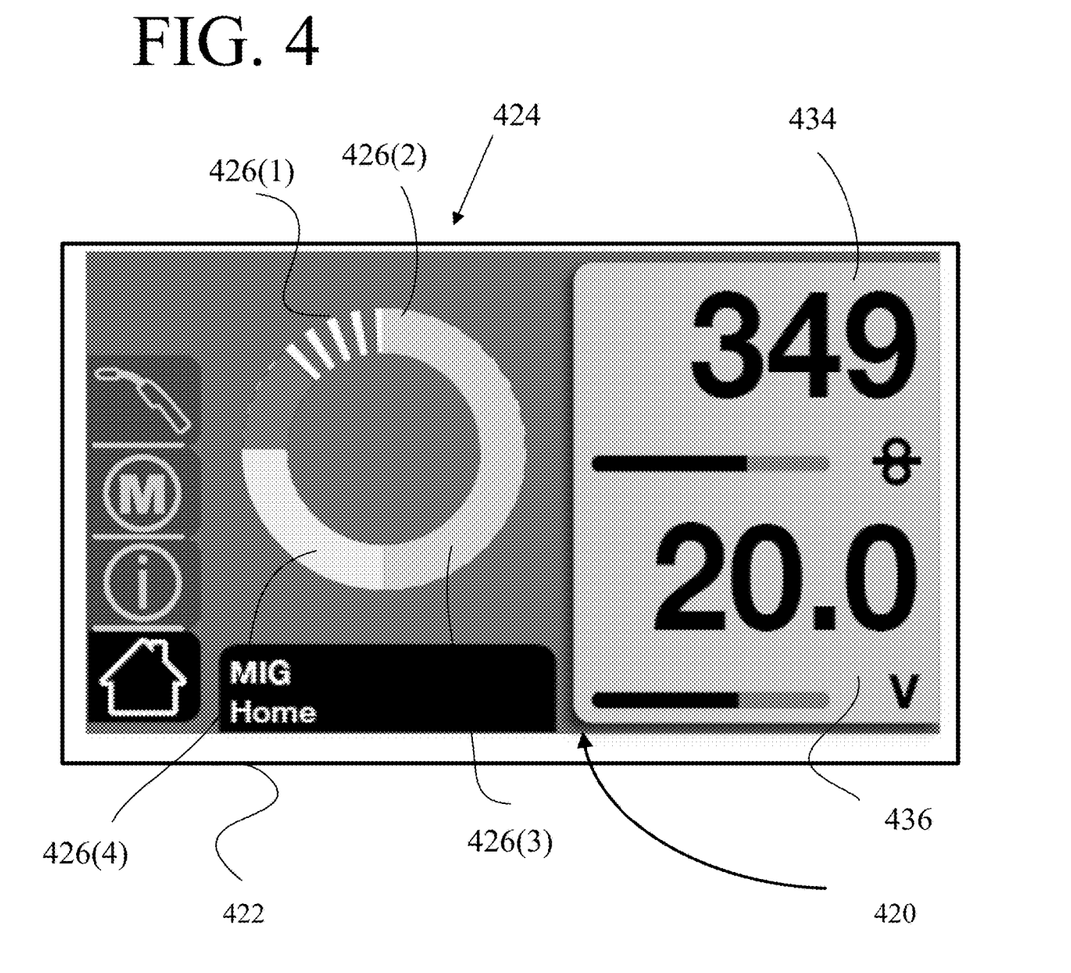
FIG. 4 is schematic diagram of a user interface display, in accordance with certain embodiments presented herein.

Referring next to FIG. 4, shown is an example display 420 provided via a display device 422 in accordance with embodiments presented herein. In the example of FIG. 4, the display 420 includes an indication 424 of the dynamic duty cycle, where the indication 424 comprises a type of circular indicator, such as a dynamic pie chart.

More specifically, the dynamic pie chart 424 comprises various color-coded, pattern-coded, or other types of sections/ranges within a circular format that are used to schematically indicate the value of the dynamic duty cycle. As shown in FIG. 4, the dynamic pie chart 424 includes four sections, including: a first section 426(1), a second section 426(2), a third section 426(3), and a fourth section 426(4). The first section 426(1) is a "standby" section which can be activated (e.g., illuminated) when the welding apparatus 100 is powered on and in a standby state. The sections 426(2), 426(3), and 426(4) are operational sections that are progressively activated in dependence upon a real-time (instantaneous) value of the determined dynamic duty cycle as the welding apparatus 100 is used to perform a functional operation (e.g., a welding, cutting, or heating operation).

For example, second section 426(2) can be a "safe" or "normal" section that is progressively activated as the dynamic duty cycle moves from a maximum value (given the present operating conditions) and a first threshold value. The third section 426(3) can be a "warning" section that is progressively activated as the dynamic duty cycle moves from the first threshold value towards a second threshold value. Finally, the fourth section 426(4) can be a "danger" section that is progressively activated as the dynamic duty cycle moves from the second threshold value towards a third threshold value. The third threshold value may be a point at which operation of the welding apparatus 100 may be automatically terminated and/or damage to the welding apparatus 100 is likely to occur.

In certain embodiments, the user (or the welding apparatus 100 itself) could adjust operating parameters of the apparatus to extend the dynamic duty cycle. That is, the welding apparatus 100 could be dynamically reconfigured in real-time, potentially automatically, so as to operate at a lower performance level, but for a longer period of time. This dynamic reconfiguration could, for example, occur at certain threshold values of the dynamic duty cycle. In such embodiments, the threshold values and or the activated sections may be changed/adjusted to account for the dynamic reconfiguration and, accordingly, the adjusted longer operational time.

In summary, the dynamic pie chart 424 of FIG. 4 is a schematic representation of the instantaneous value of the determined dynamic duty cycle, and the schematic representation changes over time. As a result, a user can use the dynamic pie chart 424 to determine when the welding apparatus 100 is approaching a potential automatic shutdown, damage, etc.

In the example of FIG. 4, in addition to the dynamic pie chart 424, the display 420 also includes information regarding operating parameters associated with the welding apparatus 100. In particular display 420 includes a display item 434 that indicates wire feed speed of the welding apparatus 100 and a display item 436 that includes a voltage of the welding apparatus 100. In operation, one or more of these parameters may be adjusted by the user, or may be determined by welding apparatus 100 automatically. Further, display items 434 and 436 may include, or be replaced with, other parameters discussed herein.

Although not shown in FIG. 4, the display 420 could also include a timer, such as that described above with reference to FIG. 3 to also provide a numerical indication of the instantaneous value of the dynamic duty cycle.

Figure 5:
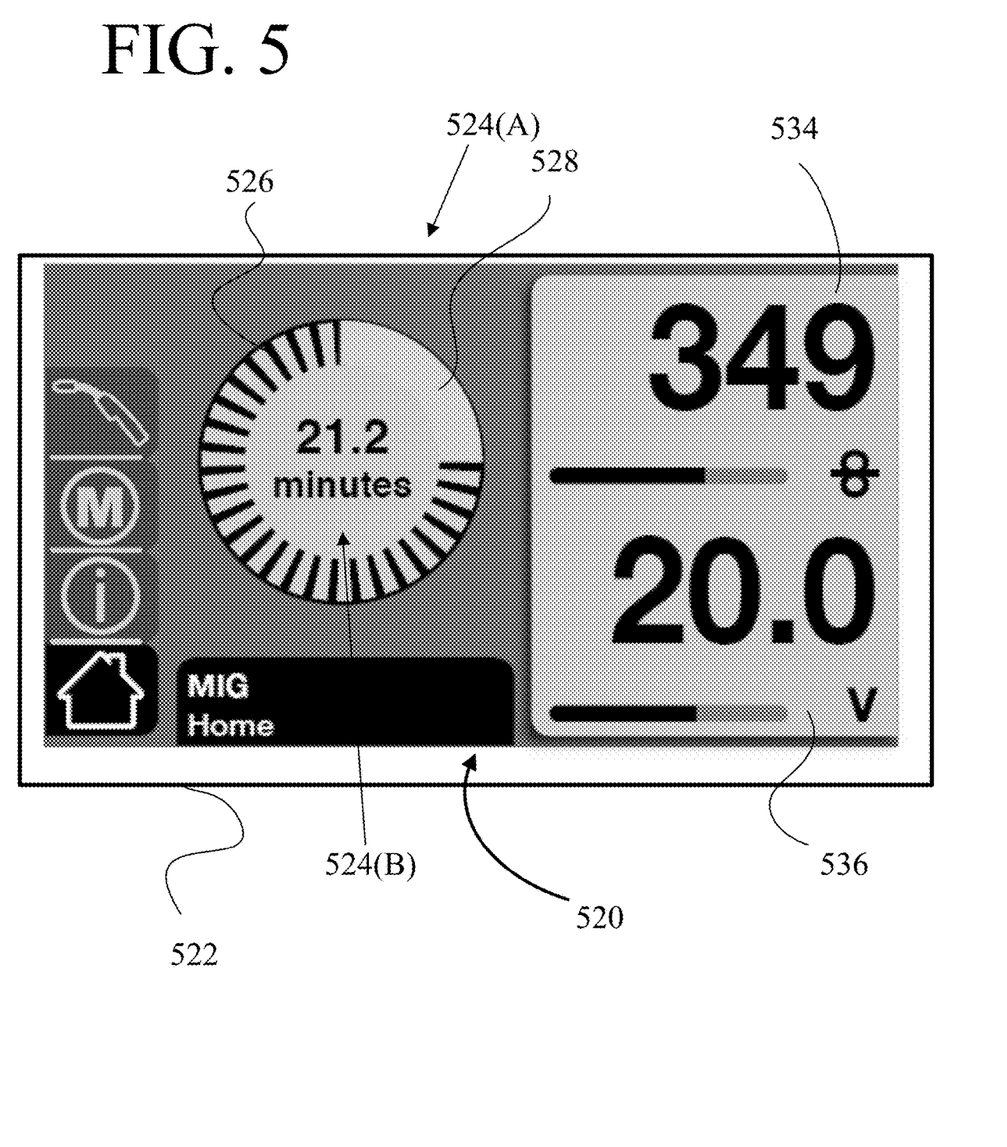
FIG. 5 is schematic diagram of a user interface display, in accordance with certain embodiments presented herein.

Referring next to FIG. 5, shown is an example display 520 provided via a display device 522 in accordance with embodiments presented herein. In the example of FIG. 5, the display 520 includes two indications of the dynamic duty cycle, shown as indications 524(A) and 524(B). The indication 524(A) comprises a type of circular indicator, such as a dynamic pie chart, while the indication 524(B) comprises a timer.

More specifically, in the example of FIG. 5, the dynamic pie chart 524(A) comprises a circular scale 526 that is progressively illuminated in dependence upon a real-time (instantaneous) value of the determined dynamic duty cycle. Illumination of the scale 526 is represented in FIG. 5 at reference 528. For example, when the welding apparatus 100 is first powered on, the dynamic duty cycle will have a maximum value for the present operating conditions. As a result, the scale 526 will not be illuminated or will be only minimally illuminated (i.e., 528 may be small or not shown). As the welding apparatus 100 is used to perform a functional operation (e.g., welding), the value of the dynamic duty cycle will gradually decrease (i.e., the remaining run time for the welding apparatus 100 is decreasing). As the value of the dynamic duty cycle decreases, the illumination of the scale 526 will increase. When the dynamic duty cycle reaches a threshold value (e.g., zero), the scale 526 may be fully illuminated. At this point, operation of the welding apparatus 100 may be automatically terminated and/or damage to the welding apparatus 100 is likely to occur. In certain examples, the illumination of the scale may change color (e.g., from green, to yellow, to red) at different threshold values of the dynamic duty cycle.

In certain embodiments, user (or the welding apparatus 100 itself) could adjust operating parameters of the apparatus to extend the dynamic duty cycle. That is, the welding apparatus 100 could be dynamically reconfigured in real-time, potentially automatically, so as to operate at a lower performance level, but for a longer period of time. This dynamic reconfiguration could, for example, occur at certain threshold values of the dynamic duty cycle. In such embodiments, the threshold values and or the activated sections of the scale 526 may be changed/adjusted to account for the dynamic reconfiguration and, accordingly, the adjusted longer operational time.

As noted, the display 520 also includes a timer 524(B). The timer 524(B) provides a direct, numerical indication of the instantaneous value of the dynamic duty cycle. That is, the timer 524(B) directly indicates a period of time (e.g., 21.2 minutes, as an example) that the welding apparatus 100 may continue to operate, given the present operating parameters, before operation of the welding apparatus 100 is automatically terminated and/or damage to the welding apparatus 100 is likely to occur. Similar to the dynamic pie chart 524(A), the timer 524(B) will dynamically update in dependence on the instantaneous value of the dynamic duty cycle. The timer 524(B) may also adjust if the welding apparatus 100 is dynamically reconfigured in real-time, as detailed above.

In summary, the dynamic pie chart 524(A) and the timer 524(B) of FIG. 5 are different schematic representations of the instantaneous value of the determined dynamic duty cycle, and these indications dynamically change over time. As a result, a user can use the dynamic pie chart 524(A) and/or the timer 524(B) to determine when the welding apparatus 100 is approaching a potential automatic shutdown, damage, etc.

In the example of FIG. 5, in addition to the dynamic pie chart 524(A) and the timer 524(B), the display 520 also includes information regarding operating parameters associated with the welding apparatus 100. In particular display 520 includes a display item 534 that indicates wire feed speed of the welding apparatus 100 and a display item 536 that includes a voltage of the welding apparatus 100. In operation, one or more of these parameters may be adjusted by the user, or may be determined by welding apparatus 100 automatically. Further, display items 534 and 536 may include, or be replaced with, other parameters discussed herein.

As noted above, in the embodiments of FIGS. 2-5, indications of the dynamic duty cycle are provided to the user. Also as noted above, although the dynamic duty cycle may be determined based on a temperature or other thermal property of the welding apparatus 100 (or components thereof), the above indications are not a direct representation of any of these thermal properties. Instead, the above indications of the dynamic duty cycle are different techniques for conveying information regarding the remaining operational time of the welding apparatus 100 to a user of the welding apparatus, given the current operating conditions. In certain embodiments, one or more of the displayed indications could be replaced by, or used in association with, a direct indication of a thermal property of the welding apparatus 100 or a component thereof. For example, in the embodiment of FIG. 3, the thermographic display 324(A) could operate exclusively based on the a thermal property of the welding apparatus 100 or a component thereof (i.e., the expansion member 328 could operate to fill the Tillable bar 326 in dependence upon a real-time (instantaneous) temperature of the welding apparatus 100 or a component thereof, rather than in dependence on the present value of the determined dynamic duty cycle.

Figure 6:
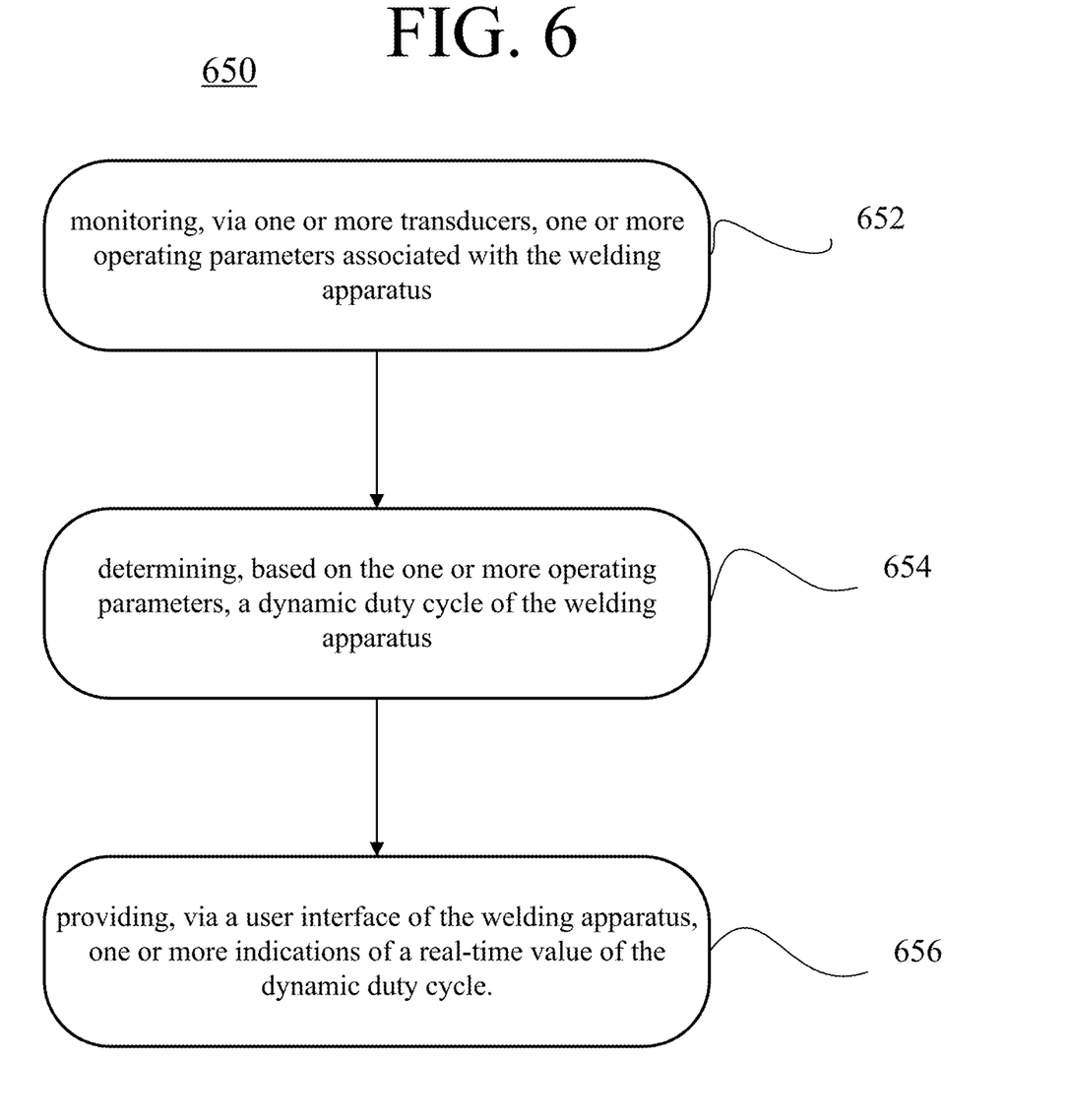
FIG. 6 is a flowchart of a method, in accordance with certain embodiments presented herein.

FIG. 6 is a flowchart of a method 650 performed at/by a welding apparatus, in accordance with embodiments presented herein. Method 650 begins at 652 where one or more transducers monitor one or more operating parameters associated with the welding apparatus. At 654, based on the one or more operating parameters, a controller determines a dynamic duty cycle of the welding apparatus. At 656, one or more indications of a real-time value of the dynamic duty cycle are provided via a user interface of the welding apparatus.

Figure 7:
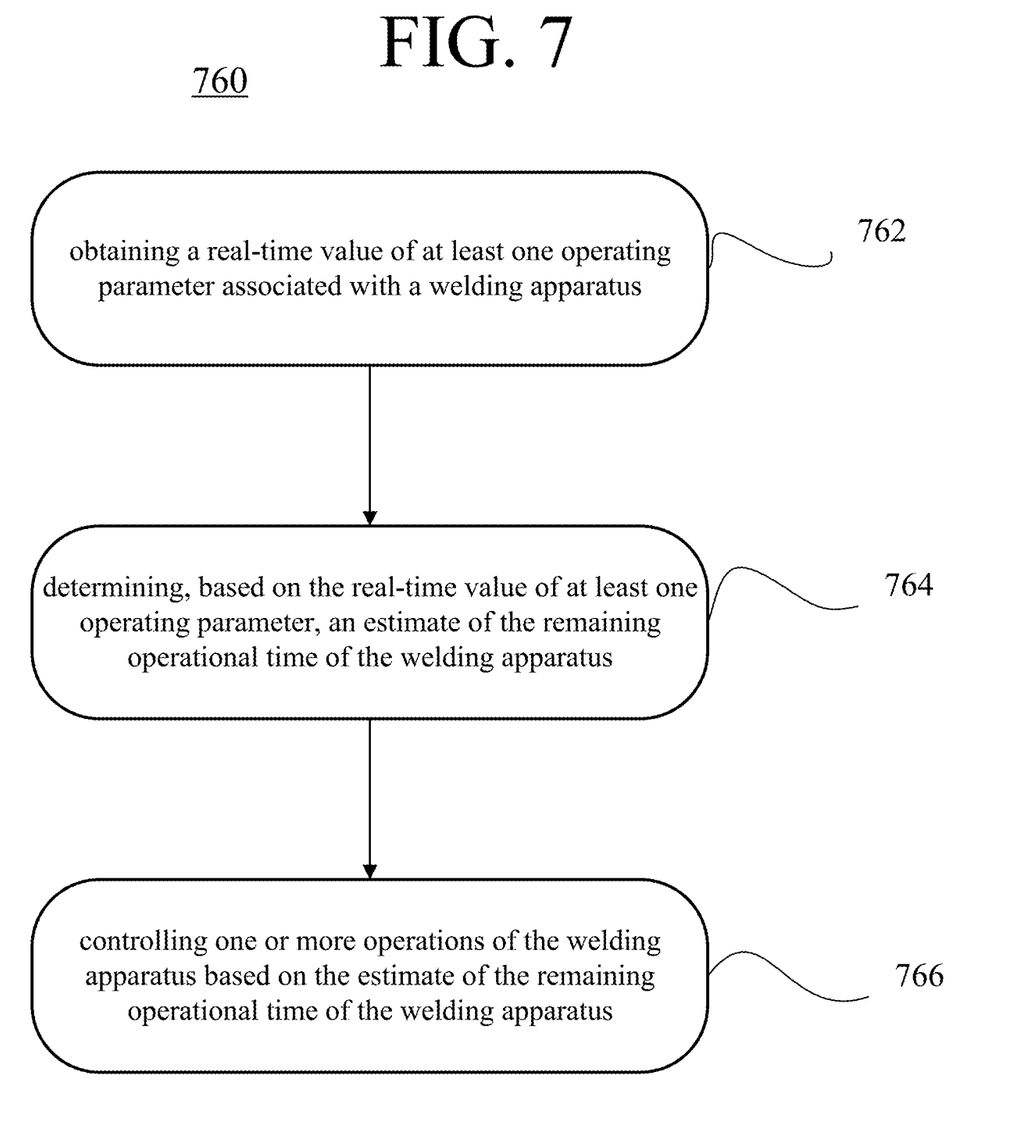
FIG. 7 is a flowchart of another method, in accordance with certain embodiments presented herein.

FIG. 7 is a flowchart of a method 760 performed at/by a welding apparatus, in accordance with embodiments presented herein. Method 760 begins at 762 where a controller of the welding apparatus obtains (e.g., via one or transducers, a user interface, etc.) a real-time value of at least one operating parameter associated with a welding apparatus. At 764, based on the real-time value of at least one operating parameter, the controller determines an estimate of the remaining operational time of the welding apparatus. At 766, the controller operates to control one or more operations of the welding apparatus based on the estimate of the remaining operational time of the welding apparatus (e.g., control an output generated by the welding apparatus, control a display of a user interface of the welding apparatus, etc.).

The present embodiments may provide one or more advantages over known welding apparatuses. For example, a known welding apparatus may rely on a user to manage operation of the welding apparatus in accordance with a predetermined and static duty cycle for a welding, cutting, or heating operation. Such conventional arrangements may lead to over utilization of the welding apparatus, which may over stress components of the apparatus resulting in damage causing decreased performance or failure. Alternatively, such conventional arrangements may lead to underutilization of the welding apparatus. As noted above, the techniques presented herein generally address these issues by determining a dynamic duty cycle that is based on the real-time operating conditions of the welding apparatus. The dynamic duty cycle may be used to automatically manage operation of the welding apparatus and/or an indication of the dynamic duty cycle may be provided to the user, thereby allowing the user to make optimal use of the welding apparatus, given the real-time operating conditions of the welding apparatus.

It is to be appreciated that the embodiments presented herein are not mutually exclusive.

The invention described and claimed herein is not to be limited in scope by the specific preferred embodiments herein disclosed, since these embodiments are intended as illustrations, and not limitations, of several aspects of the invention. Any equivalent embodiments are intended to be within the scope of this invention. Indeed, various modifications of the invention in addition to those shown and described herein will become apparent to those skilled in the art from the foregoing description. Such modifications are also intended to fall within the scope of the appended claims.

What is claimed is:

1. A method, comprising:
monitoring, via one or more transducers, one or more operating parameters associated with a welding or cutting apparatus; and providing, via a user interface of the welding or cutting apparatus, based on the one or more operating parameters, one or more indications of a measure of a remaining operational time of the welding or cutting apparatus before damage to the welding or cutting apparatus will occur, wherein the measure of a remaining operational time increases when the welding or cutting apparatus is not being used to perform a functional operation.

2. The method of claim 1, wherein monitoring one or more operating parameters associated with the welding or cutting apparatus comprises:

monitoring an ambient temperature of the welding or cutting apparatus.

3. The method of claim 1, wherein monitoring one or more operating parameters associated with the welding or cutting apparatus comprises:

monitoring an output current generated by the welding or cutting apparatus.

4. The method of claim 1, wherein providing the one or more indications of a measure of a remaining operational time of the welding or cutting apparatus before damage to the welding or cutting apparatus will occur comprises:

generating, at a display device of a user interface, a thermal gauge display, wherein the thermal gauge display dynamically changes in dependence upon the measure of a remaining operational time of the welding or cutting apparatus before damage to the welding or cutting apparatus will occur.

5. The method of claim 1, wherein providing the one or more indications of a measure of a remaining operational time of the welding or cutting apparatus before damage to the welding or cutting apparatus will occur comprises:

generating, at a display device of a user interface, a thermographic display, wherein the thermographic display dynamically changes in dependence upon the measure of a remaining operational time of the welding or cutting apparatus before damage to the welding or cutting apparatus will occur.

6. The method of claim 1, wherein providing the one or more indications of a measure of a remaining operational time of the welding or cutting apparatus before damage to the welding or cutting apparatus will occur comprises:

generating, at a display device of a user interface, a dynamic pie chart that changes in dependence upon the measure of a remaining operational time of the welding or cutting apparatus before damage to the welding or cutting apparatus will occur.

7. The method of claim 1, wherein providing the one or more indications of a measure of a remaining operational time of the welding or cutting apparatus before damage to the welding or cutting apparatus will occur comprises:

generating, at an output device of a user interface of the welding or cutting apparatus, a numerical representation of the measure of a remaining operational time of the welding or cutting apparatus before damage to the welding or cutting apparatus will occur.

8. The method of claim 1, further comprising:

automatically controlling an output of the welding or cutting apparatus based on the measure of a remaining operational time of the welding or cutting apparatus before damage to the welding or cutting apparatus will occur.

9. The method of claim 8, wherein automatically controlling an output of the welding or cutting apparatus based on the measure of a remaining operational time of the welding or cutting apparatus before damage to the welding or cutting apparatus will occur comprises:

controlling generation of an output current for at least one of a welding or cutting operation based on the measure of a remaining operational time of the welding or cutting apparatus before damage to the welding or cutting apparatus will occur.

10. An apparatus, comprising:

a power supply configured to generate an output current for at least one of a welding, cutting, or heating operation;

one or more transducers configured to monitor one or more operating parameters associated with the apparatus; and a controller configured to:

determine, based on the one or more operating parameters associated with the apparatus, a measure of a remaining operational time of the apparatus before damage to the apparatus will occur; and provide, via a user interface of the apparatus, based on the one or more operating parameters, one or more indications of the measure of a remaining operational time of the apparatus before damage to the apparatus will occur, wherein the measure of a remaining operational time increases when the apparatus is not being used to perform a functional operation.

11. The apparatus of claim 10, wherein the controller is configured to:

automatically control, based on the remaining operational time of the apparatus before damage to the apparatus will occur, an output current generated by the apparatus for the at least one of the welding, cutting, or heating operation.

12. The apparatus of claim 10, wherein the controller is configured to:

generate, at a display device of the user interface, a thermal gauge display, wherein the thermal gauge display dynamically changes in dependence upon the remaining operational time of the apparatus before damage to the apparatus will occur.

13. The apparatus of claim 10, wherein the controller is configured to:

generate, at a display device of the user interface, a thermographic display, wherein the thermographic display dynamically changes in dependence upon the remaining operational time of the apparatus before damage to the apparatus will occur.

14. The apparatus of claim 10, wherein the controller is configured to:

generate, at an output device of the user interface of the apparatus, a numerical representation of the remaining operational time of the apparatus before damage to the apparatus will occur.

15. The apparatus of claim 10, wherein at least one of the one or more transducers comprises an ambient temperature sensor.

16. The apparatus of claim 10, wherein at least one of the one or more transducers comprises a sensor configured to monitor an output current generated by the apparatus.

17. A method, comprising:

at a welding or cutting apparatus:

obtaining a real-time value of at least one operating parameter associated with the welding or cutting apparatus;

determining, based on the real-time value of the at least one operating parameter, a measure of a remaining operational time of the welding or cutting apparatus before damage to the welding or cutting apparatus will occur; and providing, via a user interface of the welding or cutting apparatus, based on the real-time value of the at least one operating parameter, one or more indications of the measure of a remaining operational time of the welding or cutting apparatus before damage to the welding or cutting apparatus will occur, wherein the measure of a remaining operational time increases when the welding or cutting apparatus is not being used to perform a functional operation.

18. The method of claim 17, wherein providing, via a user interface of the welding or cutting apparatus, based on the real-time value of the at least one operating parameter, one or more indications of the measure of a remaining operational time of the welding or cutting apparatus before damage to the welding or cutting apparatus will occur comprises:

generating, at the user interface of the welding or cutting apparatus, a numerical representation of the measure of the remaining operational time of the welding or cutting apparatus measure before damage to the welding or cutting apparatus will occur.

19. The method of claim 17, wherein providing, via the user interface of the welding or cutting apparatus, based on the real-time value of the at least one operating parameter, one or more indications of the measure of a remaining operational time of the welding or cutting apparatus before damage to the welding or cutting apparatus will occur comprises:

generating, at the user interface of the welding or cutting apparatus, a thermal gauge display, wherein the thermal gauge display dynamically changes in dependence upon the remaining operational time of the welding or cutting apparatus before damage to the welding or cutting apparatus will occur.

20. The method of claim 17, wherein providing, via the user interface of the welding or cutting apparatus, based on the real-time value of the at least one operating parameter, one or more indications of the measure of a remaining operational time of the welding or cutting apparatus before damage to the welding or cutting apparatus will occur comprises:

generating, at the user interface of the welding or cutting apparatus, a thermographic display, wherein the thermographic display dynamically changes in dependence upon the remaining operational time of the welding or cutting apparatus before damage to the welding or cutting apparatus will occur.

* * * * *

UNITED STATES PATENT AND TRADEMARK OFFICE
CERTIFICATE OF CORRECTION

PATENT NO. : 11,801,566 B2
APPLICATION NO. : 17/113259
DATED : October 31, 2023
INVENTOR(S) : Awad Gharib et al.

Page 1 of 1

It is certified that error appears in the above-identified patent and that said Letters Patent is hereby corrected as shown below:

In the Specification

Column 12, Line 1, replace "expansion member 328 could operate to fill the Tillable bar" with --expansion member 328 could operate to fill the fillable bar--

Signed and Sealed this
Nineteenth Day of December, 2023

Katherine Kelly Vidal
*Director of the United States Patent and Trademark Office*